No. 806,305. PATENTED DEC. 5, 1905.
G. P. SWIFT.
ATTACHMENT FOR GAS FIXTURES.
APPLICATION FILED NOV. 28, 1904.
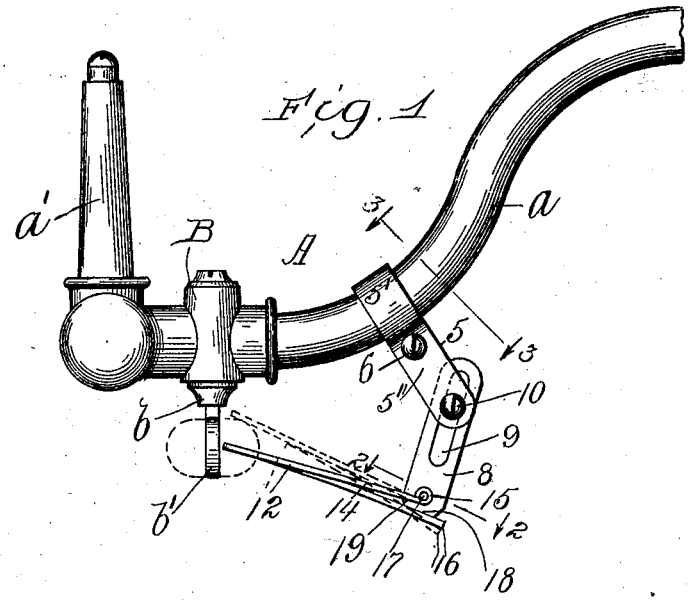
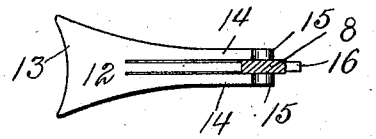
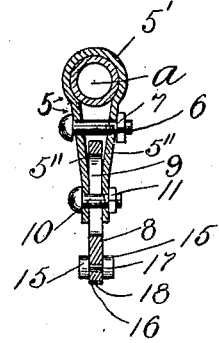
Witnesses:
Henry R. L. White
Ray White
Inventor:
George P Swift
By Forée Bain
Atty.

UNITED STATES PATENT OFFICE.

GEORGE P. SWIFT, OF CHICAGO, ILLINOIS.

ATTACHMENT FOR GAS-FIXTURES.

No. 806,305.   Specification of Letters Patent.   Patented Dec. 5, 1905.

Application filed November 28, 1904. Serial No. 234,493.

*To all whom it may concern:*

Be it known that I, GEORGE P. SWIFT, of Chicago, in the county of Cook and State of Illinois, have invented certain new and useful Improvements in Attachments for Gas-Fixtures; and I hereby declare that the following is a full, clear, and exact description thereof, reference being had to the accompanying drawings, which form part of this specification.

My invention relates to safety attachments for gas-fixtures designed to hold the stop-cock in the gas-fixture against accidental turning and to insure it being turned to proper position to fully cut off the supply of gas each time the light is extinguished.

One of the objects of my invention is to provide a device of the character described which is simple in construction, efficient in operation, cheap, and easy of manufacture.

A further object of my invention is to provide a device of the class described which may be attached to pipes of any ordinary configuration or curvature.

With a view to attaining these and other objects, which will become apparent from the following description, my invention consists in the features of construction and arrangement of parts hereinafter more fully set forth, and specified in the claims.

In the drawings, wherein I have illustrated an operative embodiment of my invention, Figure 1 is a side elevation of my invention, showing its application to a gas-fixture having a curved pipe. Fig. 2 is a section on line 2 2 of Fig. 1, and Fig. 3 is a section on line 3 3 of Fig. 1.

Throughout the drawings like numerals and letters of reference refer always to like parts.

In the drawings, A indicates in general a fitting comprising the gas-pipe $a$, which may be of any shape from a simple straight pipe to one of complex curves, a valve B, and a jet $a'$. The valve B is usually a turn-cock having a relatively slender round stem $b$ and a flat or transversely-extended handle or finger-piece $b'$, which when the cock is in closed position stands transversely of the pipe and when the gas is turned on lies with its axis parallel to that of the pipe. It is primarily for use in connection with turn-cocks of this description that my invention is designed.

Referring now to the form of attachment embodying my invention herein specifically shown, 5 indicates a clamp or support preferably made in a single piece of sheet metal bent to afford a curved or nearly-circular portion 5', adapted to partially surround the pipe $a$, and two extended arms 5'' 5''. A tension member is provided for drawing the arms 5'' together, such member being herein indicated as a bolt 6 and its nut 7, the bolt extending through suitable apertures in the arms 5'', so that by screwing up the nut 7 the arms will be tightened to closely grip pipe $a$.

8 indicates a link adjustably mounted in the clamp for movement to vary its outward extension relative to the pipe and its angular position relative to the axis of the pipe. For this purpose the link 8 is preferably slotted, as at 9, and is held in position between the ends of the arms 5'' 5'', as by a bolt 10 taking through the arms 5'' and the slot 9 and provided with a removable nut 11. It will be apparent that when the nut 11 is loosened the link may be slid longitudinally toward and from the pipe the length allowed by its slot or may be pivotally turned to any position relative to the axis of the clamp and relative to the pipe. Tightening of the nut sets the link 8 in adjusted position.

Carried by the link 8 is a lock-plate 12, preferably of suitable configuration to present a relatively wide end 13, adapted to bear against the handle $b'$ of the turn-cock on both sides of its axis to prevent its rotation in either direction and associated with the link to yieldingly tend to maintain a definite position relative thereto. At its rear end the plate 12 is divided longitudinally into three sections, two of which, 14 14, have their extremities 15 bent to form portions of a hinge-joint and the middle section 16 whereof forms a spring-tongue. The ends 15 15 of the outer sections surround a pivot-pin 17, carried by the link. The pivotal pin 17 is so placed and the end of the link 8 is so shaped that the spring 16 is normally under tension and tends to maintain the plate 12 in definite position by reason of the bearing of said spring upon a flat surface 18, afforded by the end of the link 8. Further, the end of the link 8 is shaped to afford a cam portion 19 so disposed that when the plate 12 is lifted relative to the link the spring is put under greater tension by its movement over the cam portion 19 and tends to return to its initial position.

The application of my invention to the gas-fixture is clearly shown in Fig. 1, and it will be apparent that in the attachment of the device it is merely necessary to place the clamp upon the gas-pipe and adjust the link 8 as to longitudinal extension and pivotal angle so that the free extremity of the plate 12 confronts and lies close to the handle $b'$ of the turn-cock when the latter is in closed position. When now it is desired to turn the cock to permit the gas to flow, the finger of the operator lifts the lock-plate with the same movement that enables him to take hold of the turn-cock until the extremity of said plate is above the flat or extended portion of the turn-cock and confronts the round relatively slender stem portion, as illustrated in dotted lines in Fig. 1, and the turn-cock can be freely turned. While the gas is on the lock-plate rests in dotted-line position under the tension of its spring; but when now the gas is turned off again as soon as the handle reaches the position to close the cock (and not until then) the lock-plate 12 returns under the tension of its spring to normal position, thus locking the cock against accidental turning.

While I have herein described in some detail a preferred embodiment of my invention, I do not desire to be understood as limiting myself to the exact construction shown and described further than as specified in the claims.

Having thus described my invention, what I claim, and desire to secure by Letters Patent of the United States, is—

1. An attachment for gas-fixtures comprising a clamp, a link pivotally connected to said clamp and a lock-plate adapted to bear at one side only against the turn-cock with which it may be associated carried by said adjustable link, and yielding means for normally maintaining its said lock-plate in a definite position relative to said link and adapted to permit the upward movement of the free end of said plate relative to the link.

2. An attachment for gas-fixtures comprising a clamp, consisting of a metal strip, bent to provide a pipe-encircling portion and two extended ends, means associated with said ends for varying the opening of the pipe-encircling portion, a link pivoted between said arms, and a lock-plate carried by said link.

3. In a device of the character described, a clamp, a link having a slot-and-pin connection with said clamp, means for definitely positioning said link relative to said clamp, and a spring-actuated locking device carried by the link, and arranged to bear against one side only of the turn-cock handle.

In testimony that I claim the foregoing as my own I affix my signature in presence of two witnesses.

GEORGE P. SWIFT.

In presence of—
 FORÉE BAIN,
 MARY F. ALLEN.